(12) United States Patent
Mandralis et al.

(10) Patent No.: US 7,798,055 B2
(45) Date of Patent: Sep. 21, 2010

(54) SYSTEM FOR DISPENSING SHORT AND LONG COFFEE BEVERAGES

(75) Inventors: Zenon Ioannis Mandralis, Chexbres (CH); Peter Koch, Orbe (CH); Francisco Campiche, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 1051 days.

(21) Appl. No.: 11/057,953

(22) Filed: Feb. 14, 2005

(65) Prior Publication Data
US 2005/0183578 A1 Aug. 25, 2005

(30) Foreign Application Priority Data
Feb. 20, 2004 (EP) .................................. 04003851

(51) Int. Cl.
*A47J 31/00* (2006.01)

(52) U.S. Cl. ............................... 99/295; 99/284; 99/299

(58) Field of Classification Search .................. 99/295, 99/284, 299; 426/77, 78
See application file for complete search history.

(56) References Cited

U.S. PATENT DOCUMENTS

| 3,800,690 | A | | 4/1974 | Molenar et al. |
| 4,149,454 | A | * | 4/1979 | Kemp ........................... 99/295 |
| 5,897,899 | A | * | 4/1999 | Fond ............................ 426/112 |
| 6,240,832 | B1 | | 6/2001 | Schmed et al. |
| 6,557,458 | B1 | * | 5/2003 | Blanc et al. .................... 99/280 |
| 6,763,759 | B2 | * | 7/2004 | Denisart ..................... 99/302 P |
| 6,799,503 | B2 | * | 10/2004 | Kollep et al. ................... 99/295 |
| 6,832,542 | B2 | * | 12/2004 | Hu et al. ..................... 99/302 R |
| 7,213,506 | B2 | * | 5/2007 | Halliday et al. ............... 99/295 |
| 7,216,582 | B2 | * | 5/2007 | Yoakim et al. ................. 99/295 |
| 2008/0038441 | A1 | * | 2/2008 | Kirschner .................... 426/594 |

FOREIGN PATENT DOCUMENTS

| EP | 0 844 195 | 5/1988 |
| EP | 0 512 468 | 11/1992 |
| EP | 0 512 470 | 11/1992 |
| EP | 1 255 685 | 11/2002 |
| FR | 2 612 758 | 9/1988 |
| WO | WO 01/11983 | 2/2001 |
| WO | WO 01/58786 | 8/2001 |
| WO | WO 02/43541 | 6/2002 |
| WO | WO 02/074143 | 9/2002 |
| WO | WO 03/059778 | 7/2003 |

* cited by examiner

*Primary Examiner*—Reginald L Alexander
(74) *Attorney, Agent, or Firm*—K&L Gates LLP (57) ABSTRACT

A beverage system for selectively delivering, in a same coffee extraction device, short coffee liquid extracts and long coffee liquid extracts comprising: cartridges containing ground coffee; a receiving device for receiving one cartridge at a time and pumping means or injecting water under pressure in the cartridge; means for opening the cartridge wherein these means comprises retaining means to retain the liquid under pressure in the cartridge and engaging means which engage the retaining means to open the cartridge and deliver the coffee liquid extract; wherein the system comprises at least a first cartridge adapted to deliver a short coffee liquid extract, wherein the system comprises at least a second cartridge which has substantially the same external configuration and shape as the first cartridge so as to be capable of being received in the same receiving device as the first cartridge and which is adapted to deliver a longer coffee liquid extract upon allowing a larger amount of water to flow there trough, wherein the second cartridge for the longer coffee liquid extract is configured so that water flows through it at a higher rate than in the first cartridge during extraction.

17 Claims, 3 Drawing Sheets

SYSTEM FOR DISPENSING SHORT AND LONG COFFEE BEVERAGES

BACKGROUND OF THE INVENTION

The present invention relates to a system for delivering coffee beverages from cartridges designed to be extracted under pressure and containing a substance for the preparation of a food product such as a beverage. The invention also relates to a cartridge configured to deliver a long cup of coffee in a system delivering fluid pressure usually configured to extract short cups of coffee.

SUMMARY OF THE INVENTION

Coffee cups can be produced from filter coffee machines. However, there is very little difference in the characteristics of short and long coffee cups. They usually both lack of froth or "crema" and their quality is not consistent.

Coffee dispensing systems are existing which deliver long cups of coffee by extracting coffee from filter pods in a closed chamber. The pressure is usually quite low, in the order of 2 bar or less. However, if one wants to deliver a short cup of coffee through such systems, the coffee beverage is very watery, thin and low in aroma and has a poor crema.

Cartridges designed to be extracted under higher pressure and containing a substance for the preparation of a beverage exist on the market. They provide convenience in operation as well as reproducible extraction conditions, and they ensure freshness of the substance contained therein. This ensures the delivery of freshly extracted beverages of constant quality.

EP 0512468 B1 discloses such a cartridge. The cartridge is intended to be inserted into an extraction device, in which it can be injected with a fluid and opened against a supporting part of the device comprising raised elements under the effect of the pressure of the fluid entering the cartridge.

EP 0512470 B1 discloses a method for extracting a cartridge under the pressure of a fluid passing through the bed of coffee contained in the cartridge; the cartridge comprising a membrane that retains pressure and tears in contact with raised elements of engaging means of the apparatus to let the liquid extract flow in the cup.

WO 03/059778 relates to a multi-beverage cartridge with self-opening means. The opening principle is based on a membrane of the cartridge which is torn against raised elements under the effect of the pressure of fluid building in the cartridge. The advantage is primarily that the flow is direct to the cup and the extracted liquid does not contact any part of the device.

For instance, the actual successful system commercialized under the trademark "Nespresso®" is appreciated for producing high quality short cups of coffee of the espresso and ristretto types. A short cup of coffee is defined as containing less than 50 grams of coffee liquid extract in the cup and more specifically about 40 g for the espresso type and about 25 g for the Ristretto type. Due to the high pressure extraction conditions maintained in the cartridge, in the order of 10-16 bar the liquid extract which is delivered can be given the exact desirable quality attributes in term of coffee yield, coffee solids and "crema" and within a delivery flow time which is found acceptable for the user (i.e., 15-30 s). Some consumers however, prefer to have the option to also prepare a long cup of coffee with the existing cartridges. A long cup of coffee is defined as containing about 110 (+/−10) grams of coffee liquid extract in the cup. In order to deliver a longer cup of coffee a higher amount of water needs to be sent through the cartridge. Therefore, typically coffee beverage takes a too long time to be delivered, i.e., more than 1 minute, and the resulting beverage might taste too bitter and harsh and might be slightly thin and watery. The delivery time which exceeds one minute is also unacceptable on a commercial standpoint and inconvenient to the consumer who wants to prepare several cups in a row.

Therefore, there is a need for a new system which overcomes the problems of extracting both short and long coffee cups in a same coffee extraction device. The present invention satisfies this need.

Accordingly, the present invention relates to a beverage system for selectively delivering, in a same coffee extraction device, short coffee extracts and long coffee extracts. The system comprises cartridges containing ground coffee; a receiving device for receiving one cartridge at a time and pumping means injecting water under pressure in the cartridge; means for opening the cartridge wherein these means comprises retaining means to retain the liquid under pressure in the cartridge and engaging means which engage the retaining means to open the cartridge and deliver the coffee extract; wherein the system comprises at least a first cartridge adapted to deliver a short coffee liquid extract.

The improvement to the system of the invention consists in that the system comprises at least a second cartridge which has substantially the same external configuration and shape as the first cartridge and which is adapted to deliver a longer coffee liquid extract, in the same receiving device as for the first cartridge, upon allowing a larger volume of water to flow there through, wherein the second cartridge for the longer coffee extract is configured so that water flows through it at a higher rate than in the first cartridge during extraction.

Therefore, one important feature of the invention is that a longer coffee liquid extract is obtained by a cartridge which allows water to flow at a higher rate as compared to a cartridge configured for a short coffee liquid extract.

The primary advantages are that:
(a) The delivery time for extracting a long coffee extract is significantly reduced making the system more appealing for all coffee drinkers;
(b) The coffee is not over-extracted since the contact time of ground coffee: water is reduced to reach the desired key quality attributes for a long coffee liquid extract which are significantly different than those for a short coffee liquid extract.
(c) The extraction device can remain the same for extracting both short and long coffee liquid extracts and the external configuration and shape of such cartridge can remain the same as well which results in a simpler and more convenient system.

In a preferred embodiment, the second cartridge for delivering the longer coffee liquid extract is dosed with an amount of ground coffee which is higher than the amount dosed in the first cartridge. It was surprisingly found that by putting a higher amount of ground coffee in the same configuration of cartridge, i.e. without making a bigger cartridge to receive the additional amount of ground coffee, it provided a faster flow of water through the coffee. Without being bound to theory, it is assumed that the faster flow could come from the fines or smaller particles in the bed of coffee being prevented from partially blocking the flow through the small openings torn or pierced in the membrane. Indeed, upon entering of hot water in the cartridge, the coffee particles swell. In the case of the cartridge containing a higher amount of coffee, high compression forces develop against the cartridge walls as the coffee swells. These forces compact the coffee bed and this compaction does not allow the very fine coffee particles to move freely and to collect near the water outlets to increase the internal pressure and to block the water flow. The fines being maintained in place, the flow can go faster.

The comparatively higher amount of coffee has also an important effect on the final desired quality of the long extract to ensure that the coffee extract is given the correct quality attributes and characteristics, for instance, that it is not too watery and that it has sufficient foam. Thus, preferably, the second cartridge for delivering the longer coffee liquid extract contains at least 10% by weight, even more preferably at least 20% by weight more ground coffee than in the first cartridge for the short coffee liquid extract. Optimally, the second cartridge possesses from 20 to 30% by weight more ground coffee than the first cartridge. The second cartridge can possess up to 40% by weight more ground coffee than the first cartridge.

Preferably, the dosed amount of coffee in the second cartridge for delivering the longer volume of coffee extract is determined so that the extraction time does not exceed 60 seconds, more preferably does not exceed 45 seconds. The flow time of the second cartridge is thus preferably comprised between 160 and 300 grams/minute whereas the flow time for the first cartridge is comprised between 50 and 150 grams/minute.

The quality attributes of the second cartridge, especially designed for the long coffee extract, have been preferably determined to deliver an extraction yield of between 15 and 30%, most preferably 17 to 25%, and total solids between 1.0 and 1.9% wt., most preferably 1.1 to 1.7% wt. For that, the second cartridge for the larger amount of coffee extract preferably contains between 6 to 8 grams of ground coffee whereas the first cartridge contains between 5 and 6 grams of ground coffee.

In a preferred embodiment, the retaining means is tearable or cuttable against the engaging means under the effect of the internal pressure. The retaining means may be a membrane whereas the retaining means may be a surface comprising protruding elements.

Furthermore, known coffee cartridges of the prior art are all configured to deliver short coffee extracts with membranes of higher puncture resistance thus leading to flow rates which are too slow. As a result of too slow flow rates, firstly, the quality attributes of the coffee are not well adapted, e.g., the coffee is over-extracted and induces a too harsh taste, and secondly, the delivery time becomes too long which is not appreciated by the consumer willing to have a coffee drink without waiting too long at the coffee machine.

Therefore, the invention also relates to a coffee cartridge adapted to be extracted in a system as aforementioned, to deliver a long coffee liquid extract wherein the coffee cartridge comprises:
- a closed container portion which contains a dose of ground coffee;
- a retaining membrane configured to open against engaging means of the system upon a sufficient internal pressure has been built inside the container portion as water enters the cartridge,
characterized in that:
the cartridge is configured to deliver a flow rate of between 160 and 300 gram/minute; and
the dose of ground coffee is of at least 6.0 grams.

In a preferred embodiment, the coffee cartridge has a retaining membrane with a puncture resistance of from 0.6 to 1.1 mJ.

Additional features and advantages of the present invention are described in, and will be apparent from, the following Detailed Description of the Invention and the figures.

DETAILED DESCRIPTION OF THE INVENTION

In the present description, terms are utilized for which the definitions are given as a preamble below.

The "extraction yield" refers to the character of the extract and it is defined as the weight of total solids in the liquid extract divided by the total weight of starting coffee ingredients in the cartridge (e.g., roast and ground coffee). This value is typically expressed as a percentage.

The "total solids" is defined as the weight of extracted solids contained in the extract divided by the total weight of the extract. This value is typically expressed in percentage.

The "extraction time" is defined as the time from the first moment of fluid dropping into the coffee cup to the moment the extracts has been delivered into the cup with the desired weight, strength and character.

"Short coffee extract" is defined as the liquid extract as obtained from the cartridge with a weight of from 25 to 40 grams.

"Long coffee extract" is defined as the liquid extract as obtained from the cartridge with a weight of from 100 to 120 grams.

"Internal pressure" is defined as the level of pressure retained in the cartridge during extraction as resulting from the fluid flowing through the cartridge and the resulting liquid extract draining into the coffee cup. This value is typically expressed in bar.

The "opening pressure" is defined as the maximal pressure retained in the cartridge as resulting from the fluid entering the cartridge and before the cartridge opens by piercing against the opening means. This value is typically expressed in bar.

The "puncture resistance" is defined as the energy needed to puncture the membrane of the cartridge by using a MTS Synergie 400 tensile equipment supplied by Fuch Industrievertretungen (Switzerland) as further detailed in the examples. This value is expressed in milli-Joules.

The "granulometry" of the ground coffee is defined as the diameter of the coffee particles as resulting after grinding as explained in the examples.

The "tap density" is defined as the mass per unit volume of the dry coffee as filled in the cartridge. The ground coffee is tapped in a beating machine as known in the coffee manufacturing art in a processing step called "normalising" or "densification" which occurs after grinding. The density of ground coffee can thus be adjusted accordingly. The protocol of determination of the tap density is explained in the examples. This value is typically expressed as gram per litre.

The "crema" is defined as the head of foam created on the coffee extract with a texture of substantially small bubbles. The crema attribute can be measured by an empirical sugar test which consists in arranging a well defined crystal sugar layer (sugar of density of 4.3 and 660 microns of particle size) on top of a freshly prepared cup of coffee and measuring the elapsing time between the start of overlaying and the main part of sugar's sinking. The "sugar test value" is thus a number of seconds.

"Variety" means coffee species by country of origin (grown) and/or specific region (e.g. varietal) such as Arabicas, Colombians, Ethiopians, Brazilians, Costa Ricas, Kenyas, etc.

The present invention relates to a system that uses closed cartridge and their attached benefits, as aforementioned, to provide beverages of either short or long volume. Indeed, it is an important benefit to be able to offer, within substantially the same format of cartridge, beverages having distinct beverage characteristics such as different volumes while respecting key quality attributes for each beverage, i.e., a certain extraction yield, a solid content in a certain range, a good quality of crema, and without being detrimental to the delivery time.

Although the key quality attributes are generally known for espresso-type of coffee, there have been very little studies able to determine precisely a definition of a long cup of coffee which corresponds to the consumers' preference. For a long cup of coffee, key quality attributes can be determined by different means such as by consumer tests and focus groups. Key quality attributes essentially encompass the extraction yield, the total solids and crema. It has been found that the extraction yield must preferably be maintained within a certain range. If the extraction yield is too high, the coffee is usually considered as bitter and harsh because non-desirable compounds may have been extracted over a too long time of extraction. Therefore, not only is it important to shorten the delivery of a long coffee extract for the obvious reason of the reduction of the waiting time but also a shorter delivery time tends to avoid the problems linked to the over-extraction of the coffee. Conversely, if the extraction yield is too low, the coffee tastes watery and is also not found acceptable by the average consumer. Therefore, it has been determined that an appropriate range of extraction yield is usually of from 15 to 30%, more preferably 17 to 25%, most preferably 17 to 22%. Similarly, the amount of total solids in the cup must be sufficient to confer sufficient body and texture to the beverage otherwise the coffee tastes watery and does not find consumer acceptance. Therefore, although it may also be a matter of preference, the best concentration of total solids for a long beverage has been determined to be within a range of from 1.0 to 1.9% wt, even more preferably 1.1 to 1.7% wt, most preferably 1.1 to 1.5% wt.

Finally, crema is also sought in long cup of coffee as a key element and a long cup of coffee should also deliver a sufficiently thick and stable crema. The crema should be covering the whole surface of the beverage in the cup without leaving any black holes. This is particularly challenging since the surface of the long coffee extract is much larger than that of the short coffee extract (the difference between a coffee mug and an espresso cup). The crema should also be creamy or velvety in texture, as opposed to soapy or bubbly. Its colour should be brownish to reddish and not white. Therefore, the sugar test should show a value of over 7 seconds and preferably more than 10 seconds.

For instance, in first sets of cartridges, one may deliver short espresso coffee with crema, whereas in the second set of cartridges, one may deliver long coffee with the aforementioned key quality attributes including a good crema to fit the expectations of different types of consumers.

As a whole the cartridges of each set may be marketed in such a way to be easily distinguishable by the consumer using different identification external codes such as by different colours, names, markings or other sorts of codes. Preferably, the first set of cartridges and the second set of cartridges are packaged in separate sleeves or in thin plastic bags or any suitable and convenient packages that are generally known in the art.

In the context of the invention, a set of cartridges means a series of at least one cartridge, preferably two or more cartridges. While there is no theoretical maximum limit for the cartridges, the upper limit will generally be at least 10 to 20 or 25 or more. Large cartons with 100 to 200 cartridges or more are easily achievable when desired. The first and second cartridges are generally packaged separately, but they could be packaged together provided that the user can distinguish between the different cartridges due to the colour marking or any other identifying indicia.

Figure 1:
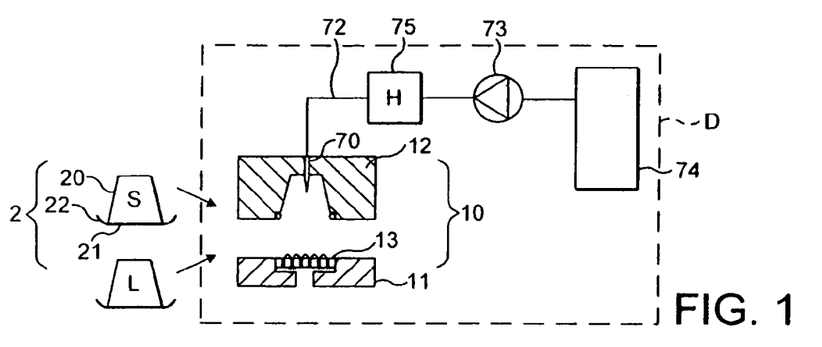
FIG. 1 shows a schematic representation of the system of the invention which enables to prepare in a convenient way long and short coffee beverages by using a single device D of extraction from cartridges coming from at least two different sets.
Figure 2:
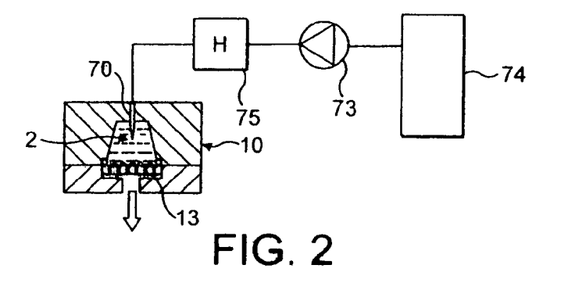
FIG. 2 shows a schematic representation of the system; the device being closed and a cartridge being extracted in the device.

FIGS. 1 and 2 schematically illustrate an exemplary system of the invention. The device D of the invention comprises an extraction module 10 for extracting coffee from a single cartridge at a time. The extraction module comprises receiving means in the form of a support base or collector 11 and an injection part 12. The support base and injection part defines an internal volume upon closing of the two parts to receive the cartridge. In the support base is located engaging means 13 arranged to engage with a retaining part of the cartridge when pressure of fluid is built inside the cartridge. The engaging means 13 may be piercing or relief means such as a series of protruding elements such as pyramids, a network of elongated ribs or needles which are provided on the surface of a plate. The coffee extract is primarily filtered by the very narrow spacing produced between the protruding elements and the edges of the openings of the membrane. The plate comprises a series of apertures to drain the extract and eventually retain any solid coffee particles. The apertures may be provided through the plates in channels formed between the protruding elements or alternatively, be provided through the protruding elements themselves.

The device further comprises at least one fluid line 72 to which the fluid can be supplied in the cartridge via an injector 70. The injector may comprise one or more needles or blades which create one or more passages for water to enter in the cartridge. The fluid is supplied under pressure in the line by means of a pump 73. The pump may be an electromagnetic piston pump or any suitable water pumping mechanism such as a diaphragm pump or pressurized head systems. A reservoir of fluid 74 can be installed upstream the pump 73 to enable fluid to be supplied in sufficient amount for delivering fluid to extract more than a cartridge. Preferably, the reservoir holds more than 750 ml of water so as to eliminate the inconvenience of repeatedly refilling the reservoir after a few extraction cycles. A heating system 75 can be installed along the line between the reservoir and the extraction module 10 to heat the fluid at a required temperature. The heater is configured to heat the water to a temperature of extraction of between 70 to 100° C. It can be a thermoblock or an instant heating device such as ceramic cartridges. The reservoir could also be such as a boiler that can keep the fluid warm or hot. A control board with switches is also usually helpful to automatically start the extraction cycle. Different controls can be added such as temperature sensors, timers, flow meters, pressure sensors, vanes, probes and so on for controlling and monitoring the extraction operations.

The first and second cartridges are also part of the system. First cartridges S are specifically configured for delivering short coffee extracts whereas second cartridges L are configured for delivering long coffee extracts. Both short and long cartridges have the same external configuration and shape. Preferably, both cartridges S and L have also a same packaging internal volume. Preferably, both cartridges S and L contain ground coffee and they comprise an airtight container portion 20 with a retaining member 21 sealed around the edges 22 of the container portion. The retaining member of the cartridges S and L can be a membrane and the like. The membrane may be flat, convex or concave. Typically, the membrane is made of a material such as aluminum or plastic. The cartridge may be flushed at a slight overpressure with an inert gas to increase the shelf life of the coffee inside. The membrane takes a slight convex shape as a result of the internal pressure of gas. Inert gas is typically nitrogen but other inert gas could be used. Carbon dioxide gas from the coffee also participates to the inside building of pressure as a result of ground coffee de-gassing inside the cartridge after filling and sealing of the cartridge. Therefore, the membrane should be sufficiently resistant to withstand the internal pressure of gas including the gas from de-gassing.

When the extraction module 10 is closed around the cartridge 2 and the cartridge is positioned in the module, as shown in FIG. 2, the retaining member is positioned adjacent or at a short distance from the engaging means 13 of the device. The membrane of the cartridge is not opened until a certain opening pressure is built within the cartridge by virtue of water coming in the cartridge. The membrane and engaging means are so arranged to not create an accidental opening before extraction begins. Therefore, as water is entering within the cartridge pumped by the pump means 75, the internal pressure builds up inside the cartridge which makes the retaining member 21 to deform and press on the engaging means 13 up to a point where it becomes pierced or torn open. The cartridge starts opening at a certain opening pressure but pressure usually continues increasing due to the compaction of the bed of ground coffee inside the cartridge and also due to the resistance created by the narrow openings torn or pierced through the membrane of the cartridge. Then, the pressure level usually flattens to a pressure of extraction which is typically of several bars above the opening pressure and then drops when the pump is shut off. The pressure level is usually the addition of the pressure created by the compacted coffee bed and the pressure of the small openings through the membrane. The pump has a fixed performance characteristic curve which means that it delivers a certain flow rate of water when downstream the pump has to overcome a certain pressure depending on the type of cartridge; e.g., a cartridge for short or long extract. For instance, if the pressure is about 9 bars, the pump will deliver a water flow rate of about 300 g/minute. As pressure increases to 15 bars, the water flow rate of the pump will drop to about 120 g/minute. The pump may be programmed to turn on and off in view of delivering an amount of water which corresponds to the proper volume of beverage depending on the type of cartridge inserted in the device. The pump may also be stopped manually, such as by a valve operated by a lever, when the coffee cup of right size is full. The pump may also be stopped automatically by using a flow meter or simply a timer in the device which controls the shut-off of the pump.

According to the invention, the system of the invention is arranged so that with its pumping means, it delivers a flow rate that is higher for the long coffee cartridge as compared to the short coffee cartridge. The ability to deliver a higher flow rate is determined by the type of cartridge inserted in the machine (cartridge S or cartridge L) and more specifically by the pressure that this cartridge will develop upon extraction. The level that the pressure will reach during extraction is determined by the amount of coffee contained in the cartridge, i.e., by having a higher dose of ground coffee within the cartridge L. In particular, the second cartridge L contains at least 10%, preferably at least 20% wt. more coffee than in the first cartridge S. For instance, the dosed amount of coffee in the second cartridge for delivering the longer coffee extract contains between 6 to 8 grams of ground coffee whereas the first cartridge contains between 5 to 6 grams of ground coffee. The total volume of the cartridges is of from 10 to 30 ml, preferably 15 to 20 ml, even preferably about 15 ml and it is the same for both L and S cartridges. The L cartridges contain more coffee and therefore are more filled while the S cartridges have more free space inside.

As a result, for preparing typically a short coffee extract of 25 to 40 grams from cartridge S, it is required that the consumer waits for 15-60 seconds. The flow rate for the short coffee extract is so of about 50 to 150 gram/minutes. The second cartridge L of the invention permits the same extraction device to deliver 160 to 300 grams/minutes so that for preparing long coffee extracts of about 100 grams, the consumer only needs 25-45 seconds. If the consumer would use the cartridge S for a long coffee extract, he would have to wait from 45 to 130 seconds which is both inconvenient and results in the development of undesirable "over extracted" flavours.

Figure 3:
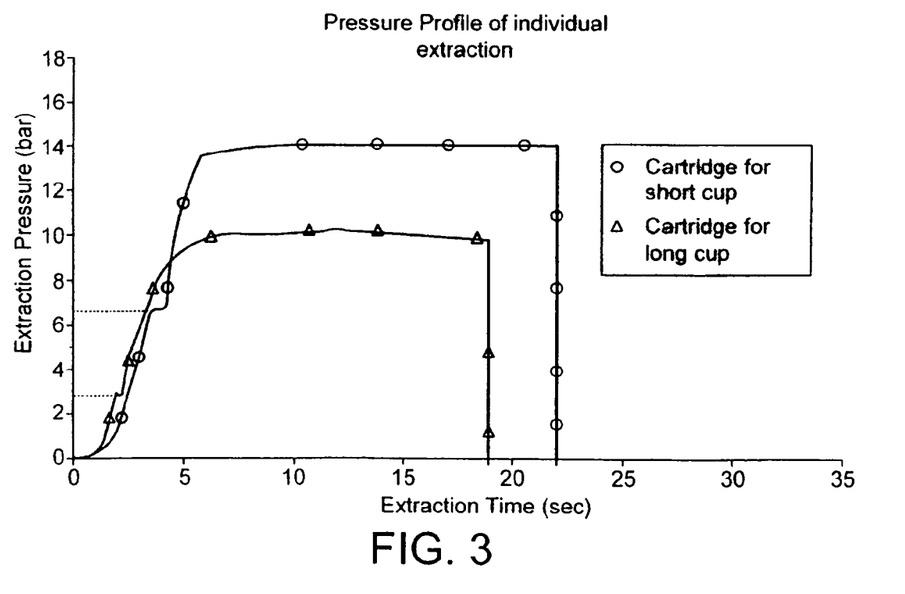
FIG. 3 shows comparative curves of the variation of pressures in the cartridges as a function of time for, respectively, a long coffee and short coffee liquid extracts.

In order to obtain a higher range of flow rates in the long coffee cartridges L, it has been determined that cartridges and the opening means from the device have to be arranged interdependently to deliver the coffee extract at an opening pressure that is lower than the opening pressure retained by the first cartridge and opening means. Preferably, the opening pressure retained in the second cartridge before opening by the opening means is at least 20% lower than the opening pressure retained in the first cartridges before opening by the opening means and the internal pressure of the second cartridge is at least 20% lower than the internal pressure of the first cartridge. FIG. 3 shows an example of the curves of pressures for a short coffee extraction obtained from cartridges S and for a long coffee extraction obtained from cartridges L. For example, for a short coffee, the cartridge S opens at a pressure of about 6.5 bars whereas, for a long coffee, the cartridge L opens at a pressure of about 3 bars only. The pressure of extraction reaches a relatively constant level of pressure at a value of about 10 bars for the cartridge S whereas it reaches a level of about 14 bars for the cartridge L. The differentials of pressures enable to deliver a coffee having quality attributes tailored to the desired beverages.

Apart from the dosing of material in the cartridge, the flow rate and thus delivery time can be further controlled by applying a different configuration of the opening means in the system depending on which cartridge is extracted, i.e., a "short" or "long" one. In fact, the differentiation in the opening means may be obtained by changing the characteristics of the engaging means and/or the retaining means.

Considering in the first place the differentiation of the retaining means as a preferred way further controlling the operational conditions of extraction depending on the types of coffee desired, the membrane of the long cartridge L is preferably configured to provide a lower puncture resistance than the membrane of the cartridge S. The puncture resistance has an important impact on the flow rate. The puncture resistance of the cartridge L should be at least 10% lower than that of the cartridge S. Preferably, the puncture resistance of cartridge L should even be at least 30% lower and most preferably 50% lower. In the preferred example, the puncture resistance of cartridge L is about 40% lower than cartridge S. In values, the puncture resistance of cartridge L is preferably ranging of from 0.6 to 1.1 mJ whereas the puncture resistance of cartridge S is preferably ranging above 1.1 mJ. A lower puncture resistance may be obtained by any suitable means by having a membrane of the cartridge L with a thickness that is smaller than that of the membrane of the cartridge S and/or by having a membrane made of a different material such as a more easily pierceable and/or tearable material than the material for the cartridge S. For aluminum material, the membrane of the cartridge L has preferably a thickness of from 15 to 25 microns, most preferably about 20 microns and the membrane of the cartridge S has a thickness of from 25 to 35 microns, most preferably about 30 microns.

Apart from the puncture resistance of the membrane, another way of controlling an earlier opening of the cartridge L as compared to cartridge S would be to have engaging means 13 of more incisive design as compared to the engaging means for the cartridge S. Therefore, it is possible to envisage that engaging means 13 be removed and replaced by other engaging means of more incisive design when considering the extraction of cartridge L. Replacement of the engaging means can be manual or automatically carried out by the device itself, for example, by the device reading a code supported by the cartridge and maintaining or changing the engaging means according to the code read. The engagements means may also be built into the cartridge and be different between the two cartridges (i.e. more incisive engaging means are built into the L cartridge).

The granulometry of the ground coffee inside the cartridge also proves to play an important role in order to set the flow rate of the cartridge L higher than the flow rate of the cartridge S. Higher flow rates are obtained when the granulometry in the cartridge L is of from 300 to 600 microns whereas the granulometry of the cartridge S is of from 200 to 400 microns. The larger particle size develops less pressure drop and the pump can so deliver a higher flow rate.

The tap density also influences the flow rate. In particular, the tap density of the cartridge L is maintained higher than the tap density of the cartridge S. Therefore, the tap density of the cartridge L should be of from 390 to 500 g/l whereas tap density of the first cartridge should be of from 300 to 430 g/l. Without being bound by theory, it is assumed that ground coffee particles that have been passed through the process of "normalising" or "densification" as it is known to those practicing coffee grinding technology, become less compressible and therefore it is easier to maintain open flow channels in the coffee bed via which a higher flow can pass.

Figure 8:
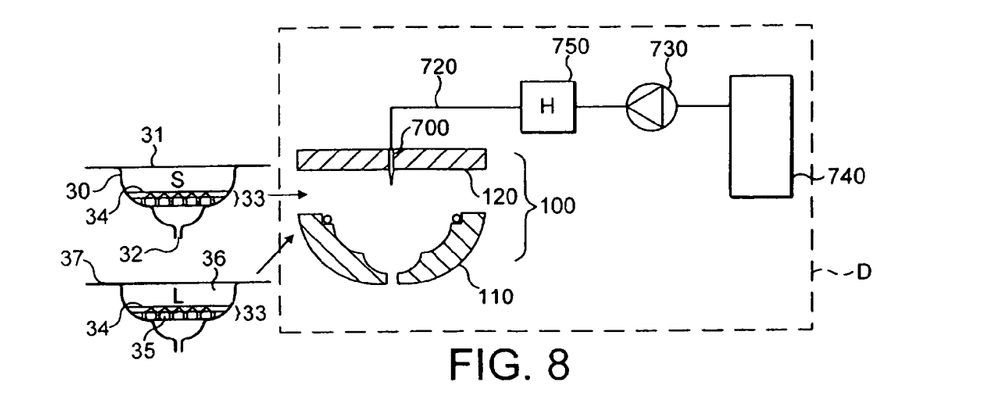
FIG. 8 shows a schematic representation of a variant of the system of the invention.
Figure 9:
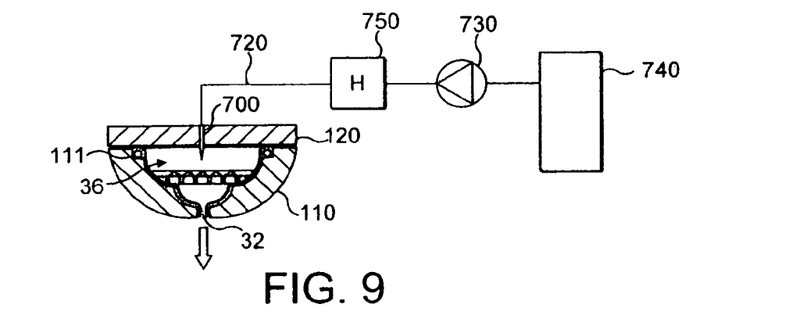
FIG. 9 shows the variant of the system in the position of extraction of a cartridge.

FIGS. 8 and 9 illustrate a variant of the system of the invention in which the opening means is an integral part of the cartridges and in which the extraction device has simply an injection means and a receiver for the cartridge but has no engaging means. More precisely, this system comprises at least a first cartridge or cartridge S configured to deliver a short coffee extract and at least a second cartridge L configured to deliver a long coffee extract; the cartridges S and L integrating their own opening device which opens under the effect of the pressure of fluid entering the cartridges at a precisely determined level. The cartridges S and L comprise a container portion 30, an upper lid 31 sealed along a peripheral edge 37 of the container portion, a lower outlet 32 with a collector for the fluid delivery and an opening device 33. The opening device is configured with a membrane 34 and a piercing, cutting or tearing plate 35. The container portion, its lid and the membrane define together an airtight chamber 36 for the ground coffee. The extraction device D has a receiving assembly 100 with a cartridge holder 110 and an injection part 120. The cartridge holder is shaped to receive the container portion and to leave a sufficient passage for the liquid extract to pass there through without touching the device so that no cross contamination can occur as it is shown in FIG. 9. Water is taken from a water tank 740, supplied under pressure by a water pump 730 and eventually heated by a heater 750, before being injected along fluid line 720 through the injection means 700 such as needles and the like in the cartridge. Upon closing of the device about the cartridge, a tightening means 111 is provided at the periphery of the chamber of the holder 110 to maintain the upper surface fluid tight and enables pressure to build properly inside the chamber 36 of the cartridge. The extraction principle is identical regardless of the type cartridge; i.e., for short or long coffee, although extractions characteristics/conditions differ. As water enters the cartridge, pressure builds up in the chamber 36 which causes the retaining means or membrane 34 to be pressed against the engaging means 35 and finally to be pierced, broken or torn at a predetermined opening pressure. As liquid extract starts to deliver through the outlet 32 of the cartridge, the pressure continues to increase up to a substantially constant level of extraction pressure. When the pump is stopped, the pressure drops and the liquid finishes to be drained through the outlet.

In a similar manner, the cartridges S and L are configured with a same external configuration but different extraction characteristics in order to allow both the short and long coffee extracts to be delivered in less than 60 seconds with the long coffee extract being delivered at a comparatively higher flow rate. In particular, the long coffee cartridge is dosed with an amount of ground coffee that is at least 0.2 times higher than the dose contained in the short coffee cartridge. Preferably, the opening means of the beverage dispensing structure of the cartridges also include:

(a) the membrane of the cartridge L has a thickness that is lower than that of the membrane of the cartridge S; and/or (b) the membrane of the cartridge L is made of a material that has lower puncture resistance than the material of the membrane of the cartridge S; and/or (c) the piercing, breaking or tearing plate of the cartridge L is made of a more incisive design as of the piercing, breaking or tearing plate of the cartridge S.

EXAMPLES

For all examples below the same extraction machine has been used with no modification in regards to the pump, heater, water injection or any other elements of the machine. The Nespresso® C300 machine was used (commercially available).

The protocols for measuring the puncture resistance, granulometry and tap density are explained as follows.

Puncture Resistance:

The tests were performed on 10 specimens of each membrane type:

At least 10 specimens were cut from the material to be tested. The samples were taken from the reel in two lines, 5 specimens over the width of the reel.

The specimens were cut using a circular cutting die of 22 mm in diameter.

Figure 4:
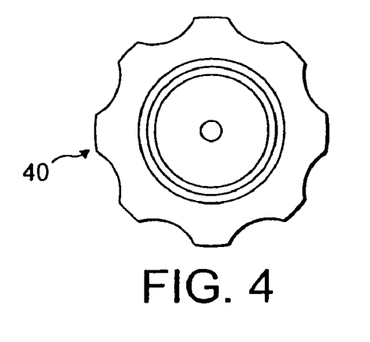
FIGS. 4 to 6 show the sample holder conceived for measuring the puncture resistance of the membrane of the cartridges in a puncture resistance test.
Figure 5:
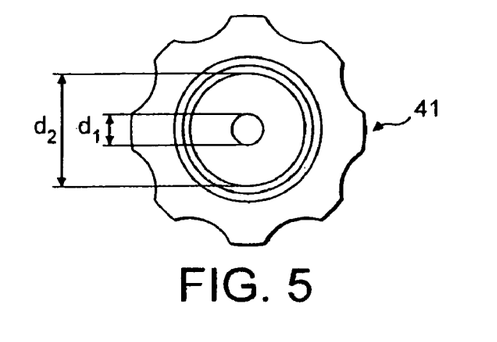
Figure 6:
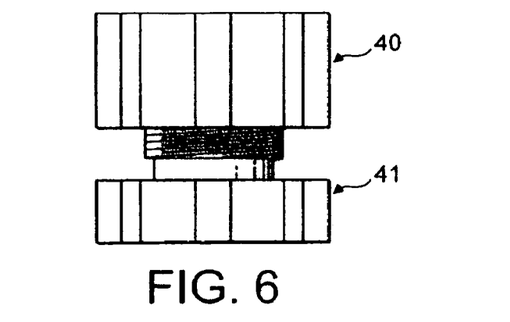

The sample holder is depicted in FIGS. 4 to 6. It consists of two threaded parts; a female part 40 and a male part 41. The sample is placed in the female part 40, the lacquer facing upwards (the test is performed from the aluminum side).

The male part, of diameter d2 equal to 22 mm, is screwed into the female part and tightened.

Figure 7:
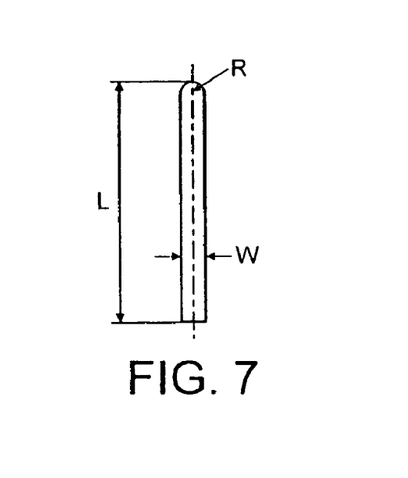
FIG. 7 shows the penetration probe in the puncture resistance test.

The penetration probe was a cylinder of 10 mm in length and 1 mm in diameter with a hemispherical tip (of radius of 0.5 mm) as shown in FIG. 7. It was attached to the load cell of the tensile tester on the crosshead. The testing equipment was constituted by a tensile tester capable of a crosshead displacement speed of 10 mm/min and equipped with a 10 N load cell. A flat horizontal plate is fastened to the lower, stationary fixture of the equipment.

The sample holder, containing the specimen, was placed on the plate, and the crosshead was lowered to a position where the probe enters the 5-mm hole (diameter d1) in the sample holder, without touching the specimen. The sample holder was centered with respect to the probe.

The crosshead was then moved down at a speed of 5 mm per minute until a pre-load of 0.1 N is reached.

The test started at a penetration rate of 10 mm/min. It was initiated when the pre-load is reached, and was stopped once the specimen is punctured. The load and displacement are recorded. The point of perforation is defined as the point of maximal load. The puncture resistance is defined as the energy to puncture, e.g. the area below the force-displacement curve between the preload and the perforation. Most tensile tester softwares are capable of calculating this automatically such as TestWorks 4, Version 4.06, from MTS Systems corporation.

Granulometry:

The particle size distribution was determined by laser diffraction using a "Mastersizer S" instrument from Malverne equipped with a 1000 mm optical lens. 1-2 g of powder are dispersed in 1 litre of butanol and recirculated in front of the laser beam in order to obtain an obscuration between 15 and 20%. The particle size distribution is obtained by Fraunhofer approximation of the diffraction pattern. The complete experiment is repeated 3 times (or until the StDev<5%) and the results are averaged.

Tap Density:

The tapped density was obtained with a Geopyc instrument from Micromeritics®. Five grams of R&G coffee sample are poured into a 25.4 mm diameter sample cell and compressed with a force of 10N. The mass of coffee is then divided by the volume obtained with the Geopyc instrument to give the tapped density.

Example 1

Short Coffee with Crema

Five grams of ground coffee are placed in an aluminum cartridge ("Cosi" type Nespresso® cartridge). The coffee ground has an average particle size of 350 microns. The cartridge comprises a thick aluminum truncated cup which is crimped and sealed at its edges by an aluminum membrane of 30 microns. The puncture resistance of the membrane is measured at 1.3 mJ. The ground coffee is normalized during grinding to a tap density of 405 g/l. The cartridge is extracted in the system of FIGS. 1 and 2 using a Nespresso® Machine "Concept" C300. Same machine is used for all tests and examples given in this document). The flow rate through the cartridge is of 122 g/minute. The pump is stopped after 20 seconds. The result is a short coffee cup of 40 grams having the following quality attributes:

Extraction yield: 20.8%
Total solids: 2.6% wt.
Crema (sugar test): 14 seconds.

Example 2

Long Coffee with Crema—Dark Roasted Blend 6.5 grams of darkly roasted ground coffee are placed in the same aluminum cartridge of example 1. The coffee ground has an average particle size of 325 microns. The cartridge comprises an aluminum truncated cup which is crimped and sealed at its edges with an aluminum membrane of 20 microns. The puncture resistance of the membrane is measured at 0.8 mJ. The ground coffee is normalized during grinding to a tap density of 410 g/l. The cartridge is extracted in the same system as in example 1. The flow rate is of 187 g/min. The pump is stopped after 35 seconds. The result is a long coffee cup of 110 grams having the following quality attributes:

Extraction yield: 25.8%
Total solids: 1.47% wt.
Crema (sugar test): 17 seconds.

Example 3

Long Coffee with Crema—Light Roasted Blend 6.5 grams of lightly roasted ground coffee are placed in the same aluminum cartridge of example 1. The coffee ground has an average particle size of 312 microns. The cartridge comprises a thick aluminum truncated cup which is crimped and sealed at its edges with an aluminum membrane of 20 microns. The puncture resistance of the membrane is measured at 0.8 mJ. The ground coffee is normalized during grinding to a tap density of 450 g/l. The cartridge is extracted in the same system as in example 1. The flow rate is of 179 g/min. The pump is stopped after 37 seconds. The result is a long coffee cup of 110 grams having the following quality attributes:

Extraction yield: 26.0%.
Total solids: 1.48% wt.
Crema (sugar test): 14 seconds.

Example 4

High and Low Puncture Resistance

A first coffee cartridge is tested with a membrane of high puncture resistance. The cartridge is filled with 6.5 grams of lightly roasted coffee ground of 425 microns average particle size. The ground coffee is normalized to a tap density of 430 g/l. The membrane for the cartridge is of aluminum with a thickness of 30 microns. The puncture resistance measured is of 1.3 mJ. The flow rate is 112 g/min. It takes 60 seconds to deliver a long coffee extract of 110 grams.

A second coffee cartridge is tested with a membrane of lower puncture resistance. The cartridge is filled with the same amount of coffee. The coffee has a granulometry of 430 g/l. The tap density is the same (430 g/l). The membrane of the cartridge is made of aluminum of thickness of 20 microns which exhibits a puncture resistance of 0.8 mJ. The flow rate is faster compared to the previous cartridge and is 192 g/min. It takes only 34 seconds to deliver a long coffee cup of 110 grams.

Example 5

Effect of Mass and Granulometry on Extraction Time

A first cartridge is filled with 5 grams ground coffee. The coffee is ground to an average particle size of 350 microns. The membrane has a thickness of 30 microns for a puncture resistance of 1.3 mJ. The tap density after normalising is 405 g/l. The flow rate is measured at 122 g/min. It takes about 54 seconds to deliver a long cup of coffee of 110 grams.

A second cartridge is filled with 6.5 grams ground coffee. The granulometry and tap density are the same as for the coffee of the first cartridge. The thickness is also 30 microns for a puncture resistance of 1.3 mJ. The flow rate is measured at 177 g/min. It takes only 37 seconds to deliver a long cup of coffee of 110 grams.

Example 6

Effect of Tap Density on Flow Rate

A first cartridge is filled with 6.5 grams of ground coffee having a granulometry of 353 microns. The aluminum membrane is 30-micron thick and exhibits a puncture resistance of 1.3 mJ. The tap density after normalisation is 405 g/l. The flow rate is 177 g/min. It takes about 37 seconds to deliver a coffee of 110 grams.

A second cartridge is filled with the same amount of ground coffee than for the first cartridge. The granulometry is of 353 microns. The membrane is 30-micron thick and exhibits a puncture resistance of 1.3 mJ. The tap density is 432 g/l. The flow rate is 290 g/min. It takes only 23 seconds to deliver a coffee cup of 110 grams.

Figure 10:
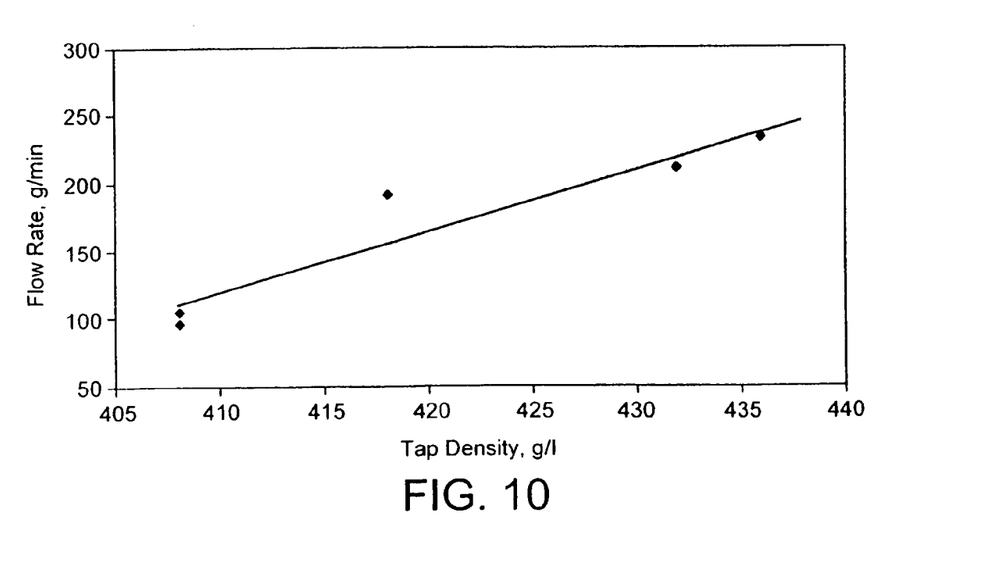
FIG. 10 shows the variation of the flow rate as a function of the tapped density in the system of the invention according to FIGS. 1 and 2.

In another set of experiments with a different coffee blend, it is shown by the curve of FIG. 10, the variation of the flow rate as a function of the tap density.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A beverage system for selectively delivering, in a same coffee extraction device, short coffee liquid extracts and long coffee liquid extracts comprising:
   cartridges containing ground coffee;
   a receiving device for receiving one cartridge at a time and pumping means for injecting water under pressure in the cartridge;
   means for opening the cartridge comprising retaining means to retain the liquid under pressure in the cartridge and engaging means which engage the retaining means to open the cartridge and deliver the coffee liquid extract;
   at least a first cartridge adapted to deliver a short coffee liquid extract,
   at least a second cartridge having substantially the same external configuration and shape as the first cartridge so as to be capable of being received in the same receiving device as the first cartridge and adapted to deliver a longer coffee liquid extract upon allowing a larger amount of water to flow there through, wherein the second cartridge has a greater amount of ground coffee than the first cartridge, the coffee in the second cartridge has a higher value of granulometry than the coffee in the first cartridge and a greater mass of coffee per unit volume than in the first cartridge so that water flows through the second cartridge at a greater rate than in the first cartridge during extraction.

2. System according to claim 1, wherein the second cartridge contains at least 10% by wt. more ground coffee than the first cartridges.

3. System according to claim 1, wherein the second cartridges contains at least 20% more ground coffee than the first cartridges.

4. System according to claim 1, wherein the amount of coffee in the second cartridge is determined so that the flow rate is between 160 and 300 grams/minute whereas the amount in the first cartridge is between 50 and 150 grams/minute.

5. System according to claim 1, wherein the amount of coffee in the second cartridge has an extraction yield of between 17 and 30% and total solids between 1.1 and 1.9% wt.

6. System according to claim 1, wherein the second cartridge contains between 6 to 8 grams of ground coffee whereas the first cartridge contains between 5 and 6 grams of ground coffee.

7. System according to claim 1, wherein, the opening means and device for delivering the longer liquid extract are arranged inter-dependently to deliver the coffee extract of the second cartridge at an opening pressure that is lower than the opening pressure retained in the first cartridge.

8. System according to claim 7, wherein the opening pressure retained in the second cartridge before opening by the opening means is at least 20% lower than the opening pressure retained in the first cartridges before opening by the opening means and the internal pressure of the second cartridge is at least 20% lower than the internal pressure of the first cartridge.

9. System according to claim 1, wherein the granulometry of the ground coffee in the second cartridge is of from 300 to 600 microns whereas the granulometry of the first cartridge is of from 200 to 400 microns.

10. System according to claim 1, wherein the tap density in the second cartridge is higher than the tap density in the first cartridge.

11. System according to claim 1, wherein the tap density in the second cartridge is of from 390 to 500 g/l whereas the tap density of the first cartridge is of from 300 to 430 g/l.

12. System according to claim 1, wherein the retaining means is tearable or cuttable against the engaging means under the effect of the pressure in the cartridge.

13. System according to claim 12, wherein the retaining means is a membrane and the engaging means comprises a surface with protruding elements.

14. System according to claim 1, wherein the different flow rates of the first and second cartridges are further achieved by a different configuration of the opening means including:
   (a) a membrane of the second cartridge has a lower puncture resistance than a membrane of the first cartridge, and/or
   (b) the engaging means is made of a more incisive design for opening the second cartridge than for opening the first cartridge.

15. System according to claim 1, wherein the different flow rates of the first and second cartridges are further achieved by a different configuration of the member for opening comprising a membrane of the second cartridge having a lower puncture resistance than a membrane of the first cartridge.

16. System according to claim 1, wherein the different flow rates of the first and second cartridges are further achieved by a different configuration of the member for opening comprising the engaging means being made of a more incisive design for opening the second cartridge than for opening the first cartridge.

17. A beverage system comprising:
- a device for receiving a cartridge and injecting water under pressure in the cartridge;
- a member for opening the cartridge and retaining liquid under pressure in the cartridge and deliver a coffee liquid extract;
- a first cartridge adapted to deliver a short coffee liquid extract,
- a second cartridge which has substantially the same external configuration and shape as the first cartridge and which is adapted to deliver a longer coffee liquid extract allowing a larger amount of water to flow there through, wherein the second cartridge has a greater amount of ground coffee than the first cartridge, the coffee in the second cartridge has a higher value of granulometry than the coffee in the first cartridge and a greater mass of coffee per unit volume than in the first cartridge so that water flows through the second cartridge at a higher rate than in the first cartridge during extraction.

* * * * *